Nov. 14, 1961 W. C. MACKLEM ET AL 3,008,864
CALENDER TRIMMING
Filed July 19, 1960 4 Sheets-Sheet 1

INVENTORS
WALTER C. MACKLEM
JOHN L. BUZZELLI
ANDREW J. McFARLANE
BY
Paul H. Blaustein
ATTORNEY.

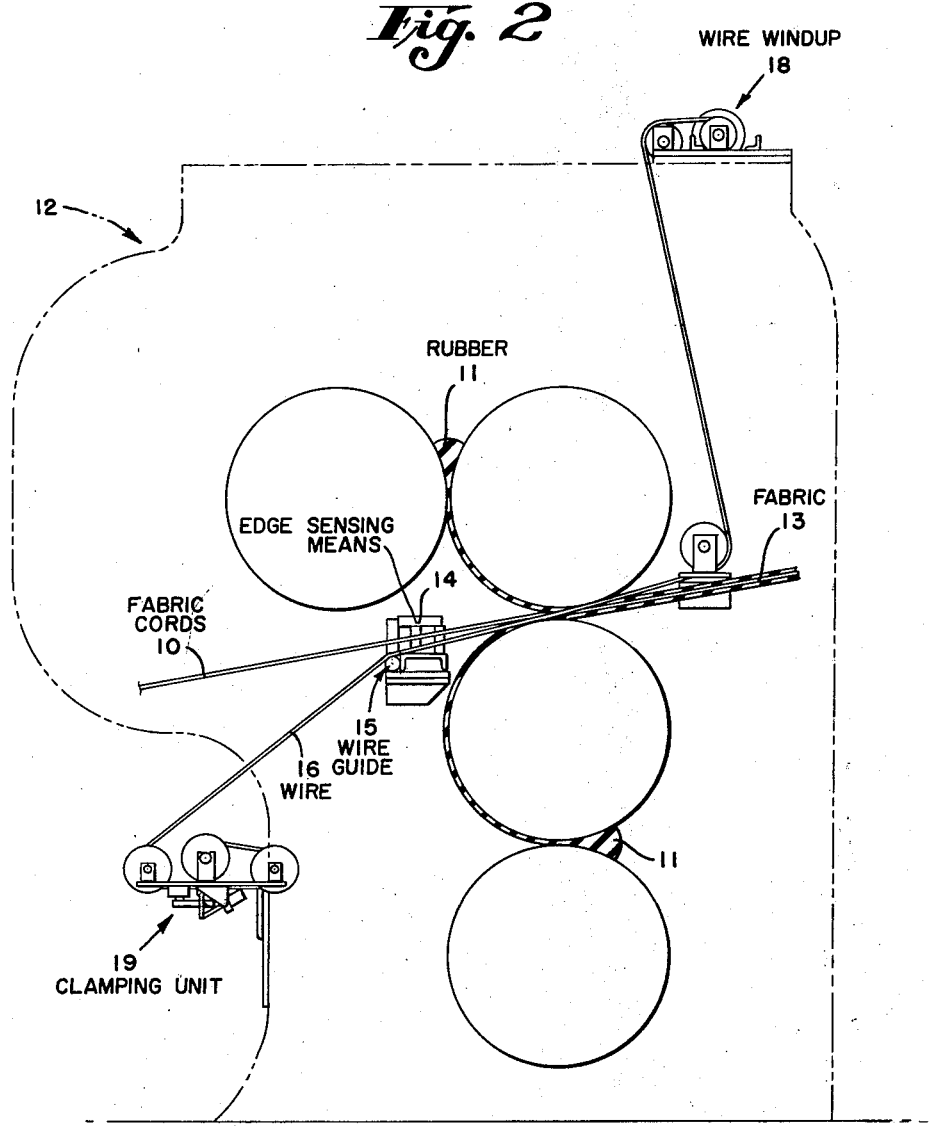

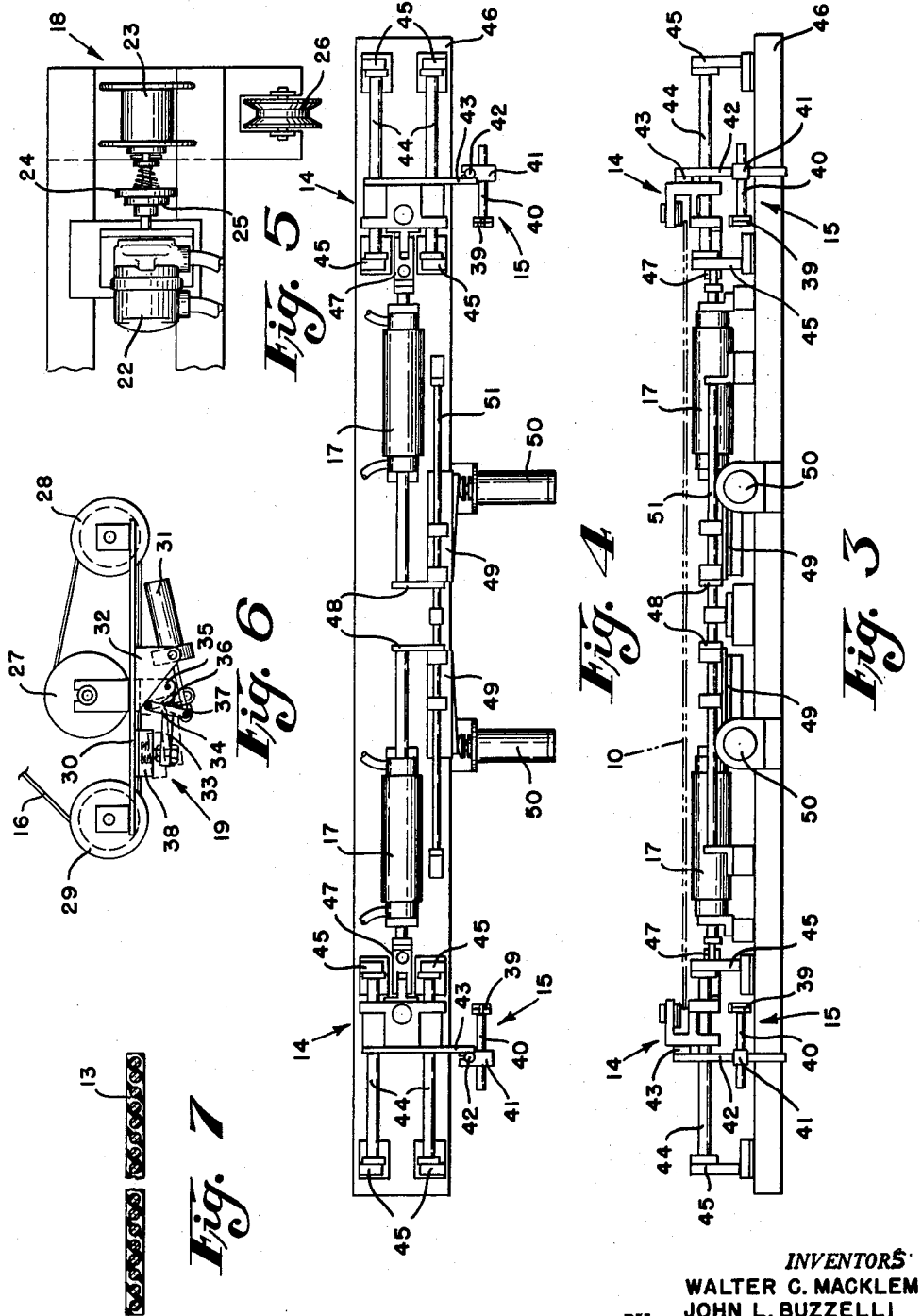

Nov. 14, 1961  W. C. MACKLEM ET AL  3,008,864
CALENDER TRIMMING

Filed July 19, 1960  4 Sheets-Sheet 4

INVENTORS
WALTER C. MACKLEM
JOHN L. BUZZELLI
BY ANDREW J. McFARLANE
Paul H. Blaustein
ATTORNEY.

United States Patent Office 3,008,864
Patented Nov. 14, 1961

3,008,864
CALENDER TRIMMING
Walter C. Macklem, Detroit, John L. Buzzelli, Warren, and Andrew J. McFarlane, Detroit, Mich., assignors to United States Rubber Company, New York, N.Y., a corporation of New Jersey
Filed July 19, 1960, Ser. No. 43,792
4 Claims. (Cl. 156—353)

This invention relates to an apparatus and process for calender trimming by which excess rubber forming at the edges of calendered fabric is substantially eliminated.

In particular, this invention relates to the trimming of calendered cord fabric by means of wires positioned adjacent to and which follow the fabric edge.

The calendered cord fabric which is used with this invention is especially designed for application to tires. The fabric eventually becomes tire plies which extend from one tire bead across the tire body to the other bead and such fabric has a number of equally spaced parallel cords. Before such a fabric can be applied to a tire it must be coated and embedded in rubber and this is done through a calendering operation in which rubber is applied to both sides of the cord fabric and pressed therebetween to fill the intervening space between successive cords. This invention is concerned with removing excess rubber which appears as a result of the calendering operation, at the respective edges of a width or series of parallel cords.

As discussed in Wells Patent No. 2,038,328 there is a tendency for the edges of a width of cord to be non-uniform inasmuch as the edge cords tend to spread or at least move apart from their initial position. This tendency is magnified during calendering and it is difficult to completely cover and embed these wandering cords with rubber. If an amount of rubber is used to completely cover and embed them, then excess rubber forms at the respective edges of a width of cords which must be eliminated.

It has been proposed by Wells to remove the marginal cords and force the excess rubber to curl over and lap the adjacent cords, after which the rubberized fabric is recalendered. This procedure requires the use of equipment to remove the marginal cords and requires repeated recalendering operations to obtain a thoroughly and evenly formed rubberized fabric edge. It has also been proposed to position a knife at the calender to cut away excess marginal rubber, however the knife can not always be positioned properly because the fabric width is not uniform having small variations. Further, the knife sometimes tears the rubber from the fabric instead of cleanly cutting it off.

Accordingly, an object of this invention is to trim and remove excess rubber from the edges of a calendered fabric in an accurate manner. A further object is to trim and remove excess rubber from the edges of a calendered cord fabric without disturbing or removing any of the cords thereof. A still further object of this invention is to provide a simple cutting element which can remove unwanted rubber stock from the edge of a fabric article having a varying contour which is positioned according to the variation of the said contour. Another object is to trim excess rubber from the edges of a calendered fabric in a novel manner.

Other objects and advantages of this invention will become apparent from the following description taken in connection with the accompanying drawings, wherein are set forth by way of illustration and example certain embodiments of this invention.

FIG. 2 is a sectional view taken on line 2—2 of FIG. 1;

FIG. 3 is an elevational view of the unit for controlling the lateral location of the wire;

FIG. 4 is an explanatory plan view of FIG. 3;

FIG. 5 is an enlarged plan view of the wire wind-up device;

FIG. 6 is an enlarged elevational view of the let-off and wire clamping device;

FIG. 7 is an enlarged sectional view of a trimmed piece of fabric;

Figure 1:
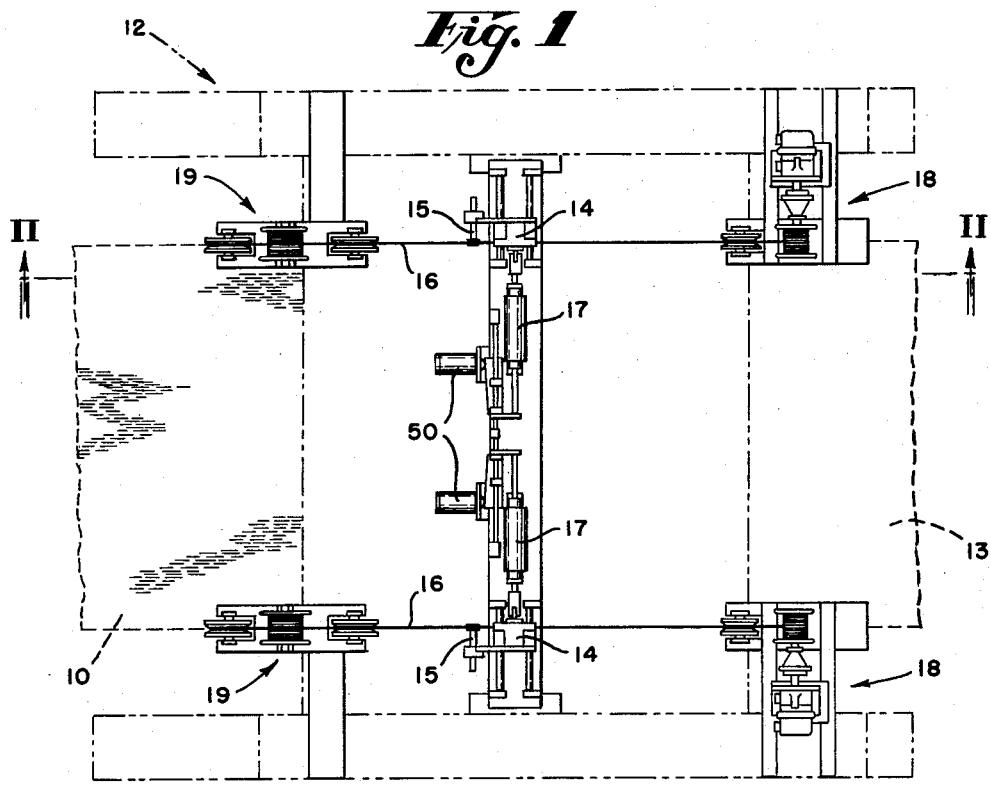
FIG. 1 is a plan view of the device adapted to a four-roll calender.

Referring now to FIGS. 1 and 2, there are shown cords 10 being advanced to a four-roll calender unit 12 where it is processed with rubber 11 according to conventional means to form a tire fabric 13. The tire fabric may be considered as a laminate having outer layers of rubber and a center layer of cords 10 with the intervening space between cords filled with rubber as shown in FIG. 7.

It is desirable to trim excess rubber from the edge of fabric 13 and to this end wires 16 are positioned adjacent the edges of the fabric cord 10 and pass through the bite of the calender rolls and are supported to form an S shape. The wires are held in position parallel to the edges of the fabric by wire wind-up units 18 and clamping units 19. Guides 15 which are part of edge sensing means 14 also function to position the wires. As the rubber at the edge of the fabric comes in contact with the wires, it is disassociated from the rubber of the fabric to form a clean sharp edge by the cutting action of the wires. The wires are thin and strong such as .025" spring music wire. Thus the edge of the fabric cord 10 and the edges of the rubber layers are flush as desired.

Inasmuch as the edges of cords 10 are not uniform, that is the width varies along the length of the cords, or the transverse position of the fabric cords varies, it is necessary to control the position of wires 16. Conventional edge sensing means 14 are provided to sense a change in edge position of cords 10 and if a change is detected, fluid cylinder 17 is actuated to transversely move the sensing means 14 to compensate for or eliminate the sensed change. Wire guides 15 mounted on sensing means 14 are also moved transversely in like manner. Wires 16 are thus positioned according to the position of the fabric cords edges by the movement of guides 15. The movement of cylinders 17 is controlled by a hydraulic valve 21 which will be discussed hereinafter with respect to FIG. 8. If desired, the width of the fabric cords 10, which is indicated by the transverse movement of both sensing means 14, can be recorded by transmitter means 50.

The edge sensing means is conventional and comprises a constant low pressure stream of air passing across a gap and impinging upon a receiving opening that is connected to a diaphragm which is biased by a spring. A hydraulic relay arm is connected between the spring and the diaphragm. When an edge appears in the gap and intercepts the air stream, the pressure upon the diaphragm is changed, hence the force acting on the relay arm is changed or an imbalance occurs and the arm is caused to move. This arm causes or actuates the piston of a hydraulic cylinder such as 17 to correct the imbalance. The edge sensing means is commercially available and is only an element of this invention.

The means for moving the wires 16 to correspond to the minor changes in the width or edge position of the fabric cords are best illustrated in FIGS. 3 and 4. Wire guide 15 has a grooved circular end plate 39 attached to a rod 40 which is horizontally mounted in a block 41 for lateral adjustment. Block 41 is slidably mounted on a rod 42 attached to a bar 43 connected to edge sensing means 14. This allows for any vertical adjustment of the wire guide 15. The lateral adjustment is necessary to provide for the prescribed amount of rubber outside of the edge cord and the vertical adjustment provides for the proper wire-to-wire contact in the bite.

Sensing means 14 are slidably mounted on parallel rods 44 supported by brackets 45 suitably attached to a base 46 which extends across the calender unit 12 below the incoming cords and the bite of the calender rolls. Cylinders 17 are double ended and are mounted on base plate 46 and each have the end of the piston rod closest to the sensing means connected thereto by means of a clevis 47. The piston rod from the opposite end of the cylinder is connected to a bar 48 which actuates a cam 49, the rise of which actuates transmitter 50, depending on the movement of bar 48. Transmitter 50 indicates a plus or minus increment in misalignment. Cams 49 are slidably mounted on a rod 51 supported by base 46. The transmitter is only a means for recording and is not necessary to the function of trimming.

The wire wind-up units 18 of FIG. 1 are shown in further detail in FIG. 5 and comprise a hydraulic motor 22 which supplies constant tension to wire 16 and takes up the wire when it is advanced. Wire 16 is wound on spool 23 when it is necessary to utilize a new section of wire in the bite of the calender rolls when the old section has worn. The shaft of spool 23 is equipped with a spring loaded clutch 24 which engages clutch plate 25 on the shaft of motor 22. A pulley 26 acts as a guide for the wire 16. One of these units is suitably mounted to each side structure of the calender.

As shown in FIG. 6, conventional clamping means 19 is equipped with a wire storage spool 27 and two guide pulleys 28 and 29 supported on a base plate 30. An air cylinder 31 is attached to the lower side of plate 30 by means of a bracket 32. Linkages 33 and 34 are attached to a bracket 35, also connected to the lower side of base plate 30. A third link 36 is connected at a predetermined intermediate point to link 33. The opposite ends of the links 34 and 36 are connected to the clevis 37 on the rod of cylinder 31. The opposite end of link 33 has a clamping plate 38 mounted thereto in such a manner that uniform contact and pressure is exerted on the wire 16 when cylinder 31 is actuated to a clamping position, thereby stopping the unwinding of the wire 16 from the storage spool.

Figure 8:
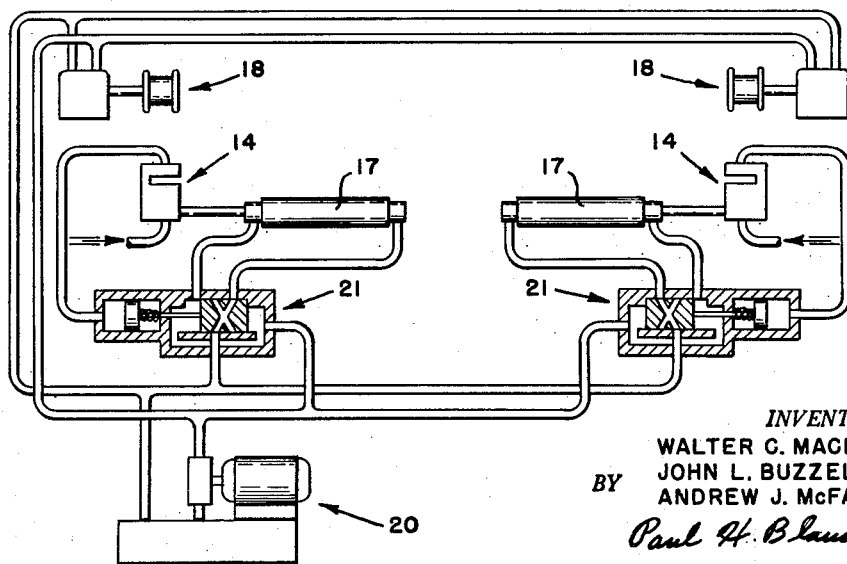
FIG. 8 is a piping diagram showing the hydraulic controls for the device.

The operation of this invention may best be explained with reference to FIG. 8. In this figure, the automatic control of this invention simulates the condition that the width of the cords 10 is too narrow for the setting of the span between the wires 16. Under these conditions, the air jet entering into sensing means 14, will in the absence of a partial obstruction of the cords of fabric 10, flow through the gap to impinge upon the diaphragm of valve 21. The air will provide pressure against the diaphragm to move the relay arm, to select one of the X-shaped intercommunicating conduits shown. Pressurized fluid from hydraulic power supply 20 is directed from the bottom-left top-right conduit of the valve so as to actuate cylinder 17 by applying fluid to its right end. The movement of the rod of cylinder 17 moves the sensing heads 14 and their attached wires 16 toward the edges of the cords 10 until the excess pressure is completely reduced by closing the gap of the sensing means 14. This in turn removes the pressure at the diaphragm of valve 21 and causes a decrease in the pressure and amount of fluid applied to the right hand of cylinder 17. A complete reduction of air pressure, caused by completely obstructing the flow of air in the gap of the sensing means 14 would switch the valve 21 to a position opposite that shown in FIG. 8. The two sensing means assemblies, one for each side of the fabric cords, operate independently and not in conjunction with one another. Thus the system described is of the type which continuously senses errors between the position of the wire and the edge of the fabric cords and provides an adjustment to eliminate this error which is typical of servo mechanisms.

Figure 9:
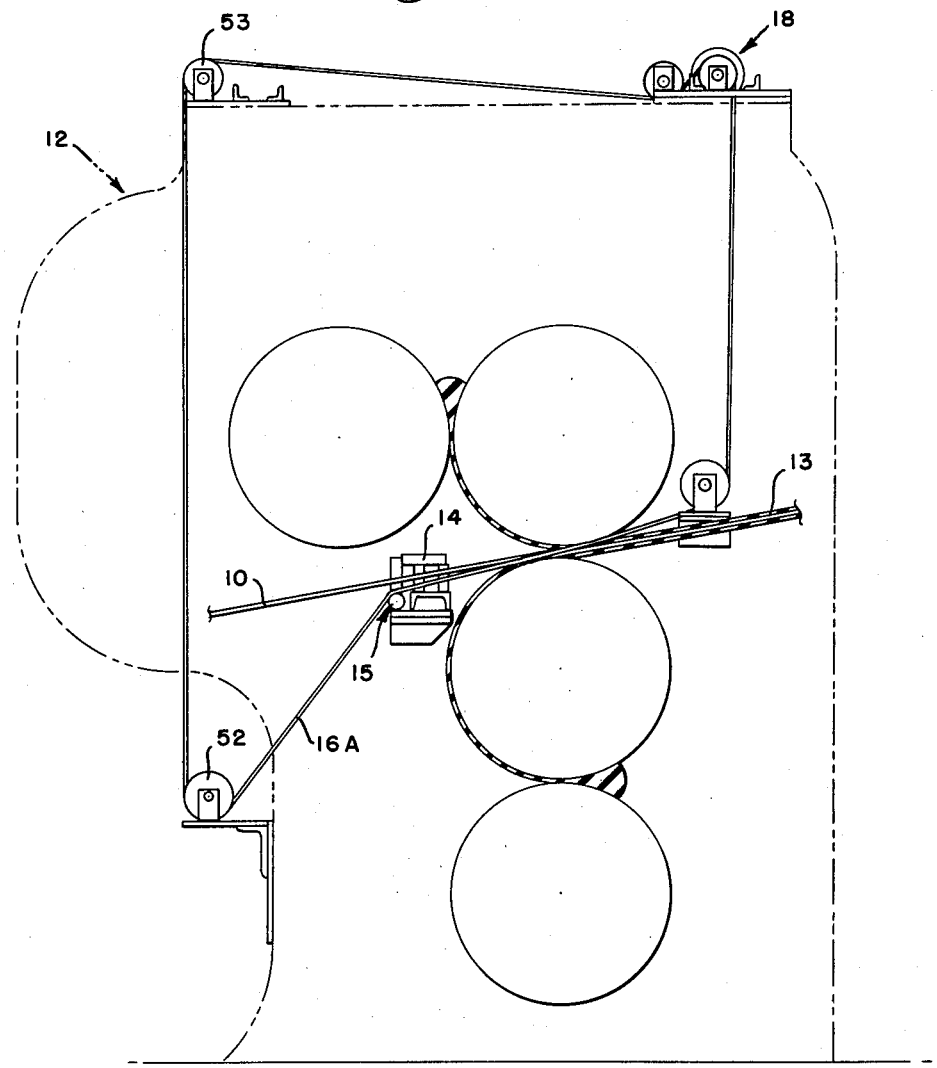
FIG. 9 is a modification wherein the cutting wire moves continuously with the flow of the calendered fabric.

The modification shown in FIG. 9 operates on similar principle except that wire 16a is continuous and is driven by the wind-up motor 18 as the fabric is closest. Idler pulleys 52 and 53 direct the wire through its continuous paths. The trimmed excess rubber can be directed back into the nips of the rolls by means which are not shown.

Having set forth the principles of this invention in conjunction with a full and complete description thereof, it may be mentioned that other variations may occur to those skilled in the art to accomplish what this invention accomplishes and still be within the teachings already set forth, but that we wish to be limited only by the following claims.

Having thus described our invention, what we claim and desire to protect by Letters Patent is:

1. An apparatus comprising means to sense the edge of a sheet material, an edge trimming wire positioned adjacent the edge of the sheet material, means coupled to and responsive to said sensing means to vary the position of said wire.

2. A calendering apparatus comprising a plurality of rotatable calendering rolls, means to apply a width of fabric cords having varying edges between the bite of two of the said rolls, means to apply rubber to the surface of said fabric, an edge trimming wire positioned adjacent the edge of the fabric and between the bite of said rolls, edge sensing means to provide a signal according to variations of the edge position, guide means positioned on said sensing means to support and move said wire, means responsive to the sensed signal to move said sensing means so as to compensate for edge variation.

3. An apparatus for removing excess rubber from the edge of a calendered rubber fabric comprising a multiple roll calender, means to apply said fabric between the bite of said calender rolls, means to apply rubber to the surface of said fabric, means to sense the edge of said fabric, a wire positioned adjacent the edge of said fabric and passing through the bite of said calender rolls, supporting means on said sensing means to support and guide said wire, means to move said sensing means transversely to the movement of said fabric as said fabric enters said calender, means responsive to said sensing means to actuate said moving means to compensate for edge variation, means to wind up said wire, and means at the opposite ends of said wire to clamp said wire when it is not being wound.

4. An apparatus as in claim 3 in which said wire is endless and is supported by a plurality of idler rollers.

References Cited in the file of this patent
UNITED STATES PATENTS

| | | |
|---|---|---|
| 1,402,288 | Fisher | Jan. 3, 1922 |
| 1,602,746 | Bowen | Oct. 12, 1926 |
| 2,779,387 | Schairer | Jan. 29, 1957 |